United States Patent
Kreiser et al.

(10) Patent No.: US 6,291,539 B1
(45) Date of Patent: Sep. 18, 2001

(54) FLEXIBLE, LOW DENSITY THERMOPLASTIC FOAMS AND METHODS FOR LOWERING THE DENSITY AND INCREASING THE FLEXIBILITY OF THERMOPLASTIC FOAMS

(75) Inventors: David W. Kreiser; Allan L. Dinkel; Juerg Patrik Weibel, all of Lancaster, PA (US)

(73) Assignee: Armacell Enterprise GmbH (DE)

( * ) Notice: Subject to any disclaimer, the term of this patent is extended or adjusted under 35 U.S.C. 154(b) by 0 days.

(21) Appl. No.: 09/567,938

(22) Filed: May 10, 2000

Related U.S. Application Data

(62) Division of application No. 09/236,745, filed on Jan. 25, 1999.

(51) Int. Cl.$^7$ ...................................... C08J 9/00
(52) U.S. Cl. ................... 521/142; 521/79; 521/143; 521/182
(58) Field of Search .................. 521/143, 182, 521/79, 142

(56) References Cited

U.S. PATENT DOCUMENTS

| | | | |
|---|---|---|---|
| 2,354,433 | 7/1944 | Carter | 264/50 |
| 2,590,156 | 3/1952 | Carpentier | 264/55 |
| 2,751,627 | 6/1956 | Lindemann | 264/55 |
| 2,768,407 | 10/1956 | Lindemann | 264/55 |
| 3,214,234 | 10/1965 | Bottomley | 264/55 |
| 3,468,990 | 9/1969 | Odell | 264/55 |
| 3,708,441 | 1/1973 | Joslyn et al. | 264/101 |
| 4,360,484 | 11/1982 | Rubens | 264/28 |
| 4,420,448 | 12/1983 | Krutchen | 264/53 |
| 4,485,059 | 11/1984 | Krutchen et al. | 264/51 |
| 5,271,886 | 12/1993 | Collom et al. | 264/50 |
| 5,290,822 | 3/1994 | Rogers et al. | 521/94 |
| 5,308,560 | 5/1994 | Bibby et al. | 264/50 |
| 5,821,272 | 10/1998 | Ochikoshi et al. | 264/50 |
| 5,905,098 | 5/1999 | Wilkes et al. | 521/88 |
| 5,955,014 | 9/1999 | Raukola et al. | 264/321 |
| 6,113,374 | 9/2000 | Brackman et al. | 425/4 |

FOREIGN PATENT DOCUMENTS

WO 98/56240  12/1998 (WO).

*Primary Examiner*—Morton Foelak
(74) *Attorney, Agent, or Firm*—Womble Carlyle Sandridge & Rice, PLLC

(57) ABSTRACT

A flexible, low density thermoplastic foam and a method for lowering the density and increasing the flexibility of a thermoplastic foam having a melting temperature and being either amorphous with a softening temperature or semicrystalline with a glass transition temperature. The method comprises the steps of (a) decreasing the pressure on the thermoplastic foam to a subatmospheric pressure, further providing that while the thermoplastic foam is under the subatmospheric pressure, the thermoplastic foam is also at a temperature in the range of less than the melting temperature and greater than the softening temperature if the thermoplastic foam is amorphous, or greater than the glass transition temperature if the thermoplastic foam is semicrystalline, whereby the thermoplastic foam expands; (b) then exposing the thermoplastic foam to a superatmospheric pressure and a secondary expansion gas for a sufficient amount of time to allow the secondary blowing gas to permeate into the thermoplastic foam; and (c) then releasing the superatmospheric pressure on the thermoplastic foam whereby the thermoplastic foam expands. With this method, it is possible to produce thermoplastic foams having densities as low as 0.008 grams/cc. Also included in this invention are insulations made from these low density foams.

15 Claims, 1 Drawing Sheet

FLEXIBLE, LOW DENSITY THERMOPLASTIC FOAMS AND METHODS FOR LOWERING THE DENSITY AND INCREASING THE FLEXIBILITY OF THERMOPLASTIC FOAMS

CROSS REFERENCE TO RELATED APPLICATION

The present application is a division of co-pending U.S. patent application Ser. No. 09/236,745, filed Jan. 25, 1999.

FIELD OF THE INVENTION

This invention relates generally to thermoplastic foams and the processing of thermoplastic foams, and more particularly to a method for lowering the density and increasing the flexibility of thermoplastic foams.

BACKGROUND OF THE INVENTION

Thermoplastic materials are those that soften and flow upon application of pressure and heat. Thermoplastic foams are defined, generally, as foams made from thermoplastic resins. Because thermoplastic materials regain their original properties upon cooling, most thermoplastic materials can be remolded many times. Examples of thermoplastic resins include poly(vinyl chloride), polyethylene polystyrene, acrylate resins, and poly(ethylene terephthalate).

It is known to produce thermoplastic resin foam materials having substantially closed-cell structures by intimately incorporating within the resin material a volatile organic liquid which vaporizes upon heating to form a gas (the liquid is known as the blowing agent, its resultant vapor the blowing gas). It is also known to use a solid substance as the blowing agent where the solid substance decomposes to form the blowing gas. The vapor created from the blowing agent is the blowing gas (often also referred to as simply the blowing agent) and causes the thermoplastic to expand and form a cellular mass.

Thermoplastic resin materials that have been foamed by the action of a volatile organic blowing agent producing a primary foaming gas may thereafter be induced to further expand. This secondary expansion is achieved by exposing the foamed material to another gas (a secondary gas), such as steam or air, which has a permeability rate greater than the permeability rate of the primary foaming gas through the cell walls of the foamed mass. During the exposure to this secondary gas, the material is reheated to a heat softening temperature. The secondary gas, which has a permeability rate through the cell wall greater than that of the primary gas already in the cell, permeates the cell wall and joins the primary gas inside the cell. At the heat softening temperature, the combined effect of the primary gas and the secondary gas causes further expansion of the initially foamed material. The result is a lower density foam product.

It is further known that thermoplastic resin materials that have been foamed by the gas emitted upon decomposition of a solid substance may thereafter be induced to further expand. This further expansion is achieved by heating the foamed material to a temperature near the melting point of the resin while subjecting it to a secondary gas at superatmospheric pressure. After this step is performed, the foamed material is reheated to a heat softening temperature at a lower pressure (i.e. atmospheric pressure). This causes the gas to expand inside the cells. The combined expansion of the primary gas and the secondary gas (which has entered the cells of the foamed material primarily because of the internal/external pressure differential during the application of the superatmospheric pressure) produces a lower density foam product.

SUMMARY OF THE INVENTION

The present invention is an improved, low density thermoplastic foam and an improved method for treating thermoplastic resins to achieve foams of lower density and increased flexibility. Foams having densities as low as 0.008 grams/cubic centimeter (g/cc) are obtainable.

The invention involves a multi-step process. The first step calls for decreasing the pressure on a primarily foamed thermoplastic resin and, while the foam is subject to this decreased pressure (under at least a partial vacuum), increasing the temperature of the foam. The foam temperature is increased to a point between the glass transition temperature and about the melting point of the foam, if the resin is made from a semicrystalline resin. If the resin is amorphous, the temperature is raised to a point between the softening temperature and the melting point of the amorphous foam. While these temperature and pressure conditions are sustained, the foam expands. The foam expansion is the result of the cells in the foam undergoing an increase in volume due to the temperature increase and pressure decrease. The order in which the temperature and pressure are changed is irrelevant—they may even be adjusted simultaneously. Furthermore, if the foam is taken directly from a foam extrusion process, the foam may already be at the proper temperature. In fact, from the foam extrusion process, the temperature may even have to be lowered before allowing the first step to occur. The conditions reached in the first step are held for a predetermined time, to allow adequate foam expansion, before moving to the second step.

The second step involves exposing the primarily foamed (and expanded) thermoplastic resin foam to a secondary expansion gas for a sufficient amount of time to cause secondary expansion. Secondary expansion occurs when the secondary gas permeates the cells of the thermoplastic resin and joins the primary blowing agent inside each cell. The pressure under which the foam is subject during this second step is preferably at least about 1 pascal (Pa) above atmospheric pressure. For a faster permeation rate and subsequent expansion, the pressure should be at least about 500 kilopascals (kPa) above atmospheric pressure. When the pressure is released, the foam will expand again, thereby lowering its density.

In this second step, it is preferred that the temperature is in the same range as that used in the first step. Although it is possible to perform the second step at temperatures up to the melting point and down to ambient temperatures, the process would, in the later case, be unsuitably long. The temperature can be maintained from the first step, or the material can be cooled and later reheated. In addition, the temperature can be increased before, during, or after the pressure is adjusted. After the gas permeates the foam cells during the second step, the pressure is released and expansion occurs. The foam can be cooled before, during, or after the pressure is released. Preferably, the foam will be cooled after pressure is released and expansion is allowed to occur.

The density reduction achieved by this process can be up to 96%; controlled density reductions can be in the range from about 15% to about 96%. More preferred density reductions will be in the range of from about 50% to about 96%.

BRIEF DESCRIPTION OF THE DRAWING

The invention is best understood from the following detailed description when read in connection with the following drawing, in which.

DETAILED DESCRIPTION OF THE INVENTION

Figure 1:
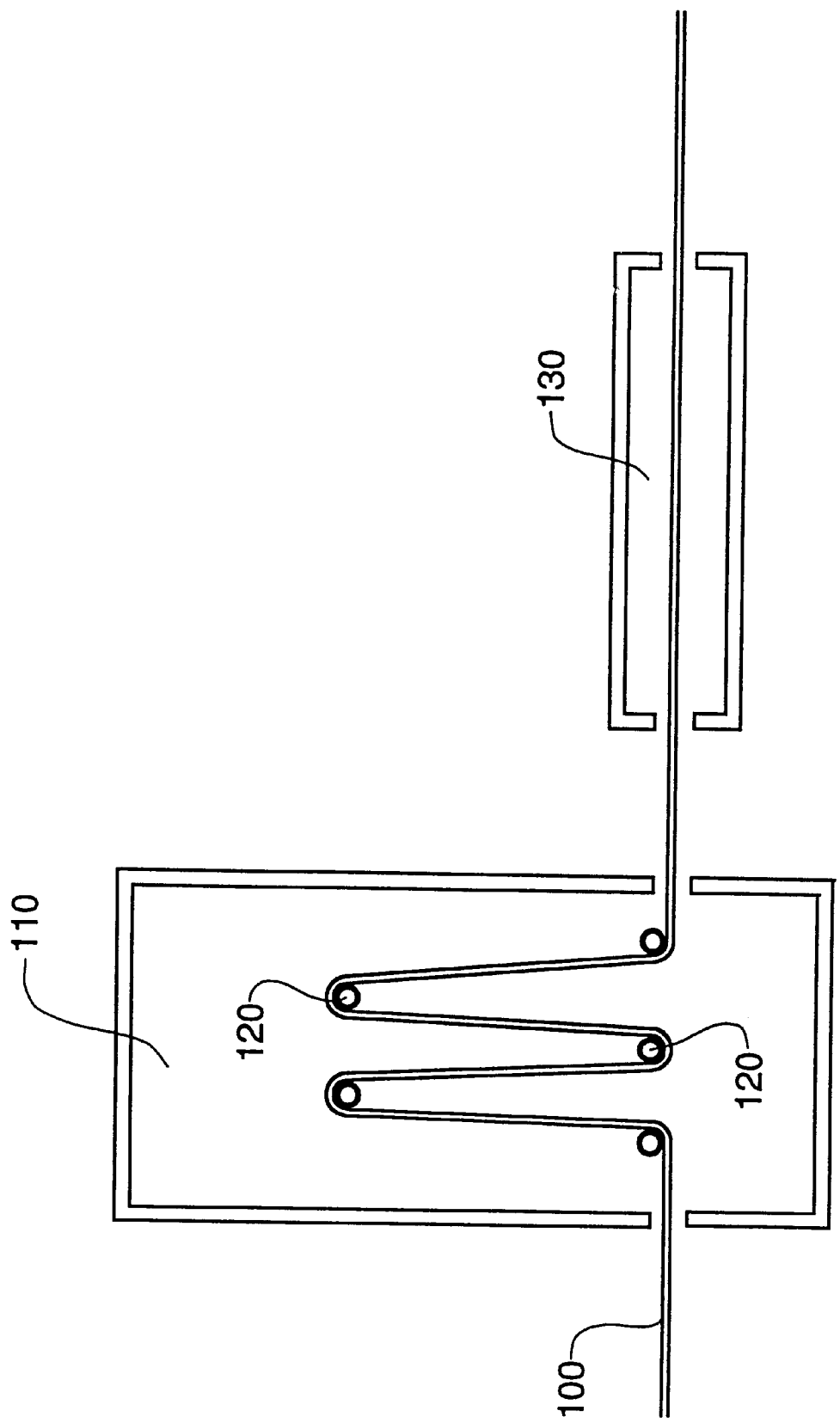
FIG. 1 is a block diagram that schematically illustrates a continuous operation for carrying out the steps according to the present invention.

The present invention is an improved, low density thermoplastic foam and an improved method for treating thermoplastic foams to achieve foams of lower density and increased flexibility. The invention involves a two-step process. The first step involves increasing the temperature of a primarily foamed thermoplastic resin to a first temperature which is between the glass transition temperature of the foamed thermoplastic resin and the melting temperature of the foamed thermoplastic resin if the resin is semicrystalline, and between the softening temperature and melting temperature if the resin is amorphous. While this first temperature is maintained, the pressure acting on the primarily foamed thermoplastic resin is reduced to a subatmospheric pressure. The order in which the temperature and pressure are changed is irrelevant, and they may be adjusted simultaneously. The conditions reached in the first step are then held for a predetermined time before moving to the second step.

The second step involves exposing the primarily foamed thermoplastic resin to a secondary expansion gas. During this exposure, the pressure is increased to a superatmospheric pressure, and the foam temperature can go from ambient up to the melting point. Although the high temperatures do not have to be used in this step, the cooler the foam is kept, the slower the permeation rate of gas into the cells. This exposure to elevated temperature and pressure is allowed to occur for a sufficient amount of time to cause the secondary expansion gas to permeate into the cells of the thermoplastic resin. Preferably, the pressure is released from the foam before the temperature is allowed to drop, although the order in which these variables are allowed to drop is not critical to achieving the density decreases.

The first step discussed above involves, effectively, a pretreatment of the primarily foamed thermoplastic resin material, prior to conducting the secondary blowing. The elevated temperature during the pretreatment acts in two ways to increase the size of the cells of the material. The temperature increase causes an expansion of the primary blowing gas which is already in the cells. The elevated temperature also affects the material walls, softening the material and allowing it to expand more easily. Thus, the temperature is chosen so that the primarily foamed material is soft enough to further expand, yet is not so soft that the existing cell structure collapses or the cell walls tear. Typical temperatures used during this pretreatment step range from about 80° C. to about 120° C. for poly(ethylene terephthalate), and from about 25° C. to about 60° C. for polyethylene. Moreover, the temperature is selected based on the particular polymer being treated. The temperature should be between the glass transition temperature and the melting temperature of the polymer comprising the semicrystalline resin material, and between the softening temperature and melting temperature of the polymer if it is amorphous.

The temperature, although selected with the above considerations in mind, is also dependent on the amount of vacuum pulled and the type of polymer which comprises the material. Thus, there is an interdependence between the vacuum pulled and the temperature of the system during which the subatmospheric pressure is applied. The subatmospheric pressure must be adequate to cause the expansion of the cell, in conjunction with the temperature elevation. The pressure may be reduced to any point less than atmospheric. The pressure can be reduced as far as technically possible. Pressures can, thus, go as low as 1 Pa. The pressure is generally reduced to at least 5 Pa below atmospheric, and preferably to at least 100 kPa below atmospheric. Thus, the pressure reduction will range from 0 gauge down to about −100 kPa gauge, and preferably it is from about −5 Pa gauge to about −96 kPa gauge. The 0 gauge level is atmospheric pressure and can be achieved when the foam is cool and only needs to be heated to be brought into the correct temperature range for necessary expansion.

In some cases, depending on the polymer, lowering the pressure during the first step is not even necessary. Where only a small amount of increase in volume is desired in order to obtain the necessary stretching, merely increasing the temperature can work if the temperature was not already in the desired range. In an exemplary embodiment, both a temperature increase and a pressure decrease are effected on the material. This combination provides a substantial density decrease.

After the first step is complete, the material often appears deflated. This is because the cells have been effectively stretched during the first step. When the pressure on the material is returned to atmospheric pressure, the material appears crushed. At this point, the material is ready to be secondarily blown.

In this second step, the material is subjected to an increased temperature and pressure while being exposed to the secondary blowing agent. Any superatmospheric pressure can be used. The pressure can go from as little as 1 Pa up to the technical limit of pressure vessels used—up to about 10,000 atmospheres. At the lower levels of 1–10 Pa, however, the step will proceed undesirably slowly. Therefore, the pressure should be up to a level in the range of from about 500 kPa to about 10,000 kPa. A range from as little as 100 Pa over atmospheric pressure to about 1000 kPa is a preferred pressure range for the superatmospheric pressure of the second step.

The secondary blowing agent, then, under pressure, permeates the cell walls and joins any remaining primary blowing agent inside each cell. Generally, the higher the pressure and temperature, the faster the secondary expanding agent will impregnate the cells. Permeation modifiers such as glycerol monosterate or fatty acids will also have an effect on the permeation rate. Generally, any appropriate gas may be used as the secondary blowing agent. Typical gases include carbon dioxide, air, nitrogen, argon, fluorocarbons, hydrochlorofluorocarbons, and hydrocarbon gases. These and like gases can be used alone or in combination. When the higher pressure is released, the cells reinflate and expand beyond their original volume. The lower density and higher flexibility is thereby achieved, and the material is dimensionally stable. It can now be further processed by molding, forming, etc. if desired.

The invention can be practiced in several different manufacturing techniques, including both batch and continuous operations. FIG. 1 illustrates, schematically, an example of a continuous operation. A primarily foamed resin sheet 100 is transported to a chamber 110 wherein it is exposed to reduced pressure and increased temperature by passing sheet 100 around rollers 120 configured so as to give sheet 100 a deviated route within chamber 110. The length of the deviated route around rollers 120, the number of rollers 120, and the rate of transport will provide the appropriate residence time for sheet 100. The residence time requirements are determined based on the amount of expansion desired prior to the secondary blowing, as discussed above. Sheet 100 can then be transported, optionally through a second series of rollers (not shown), to a second chamber 130 wherein secondary blowing is allowed to occur. When the foam being used is taken directly from an extruder, it might already be at the desired temperature. In such a case, the pressure alone needs to be adjusted.

The process may, alternatively, be carried out in a batch operation. In such a case, the primarily foamed material to be treated is placed into a first chamber wherein pressure is reduced and temperature is increased. After expansion is allowed to occur, the material is removed and placed into a second chamber where the secondary blowing is effected. Alternatively, the same chamber may be used for both steps, wherein the temperature and pressure conditions are manipulated at different times to effect both steps during the overall residence time.

Suitable resins include any thermoplastic material. Preferred materials include polystyrene polymers (amorphous) such as copoly(styrene-acrylonitrile), olefinic polymers (semicrystalline) such as polyethylene, polycarbonate polymers, and polyester polymers (semicrystalline) such as poly(ethylene terephthalate). The thermoplastic foams of the present invention, although made from these polymers, may also include additives to enhance the overall desirability of the foam. One such additive would add fire retardant characteristics to the foam. Other additives could also be added, such as to affect the color of the final product.

The primarily foamed material which is the starting point for the present invention may be of any size or shape. Sheet material is preferred if a continuous operation is going to be used. In addition, sheet material can later be formed to the desired shape after density reduction has been achieved. The primarily foamed material is substantially amorphous in nature at the time of the vacuum expansion. Materials that are predominately crystalline at the time of vacuum expansion do not sufficiently achieve the low densities embodied in the present invention. In an exemplary embodiment, the primarily foamed material is substantially closed cell so that the cells can be pressurized by the secondary expanding agent. The primarily foamed material in this embodiment also has a substantial portion of the primary foaming agent retained in the cells.

The thermoplastic polymer foams of this invention are particularly well suited for use as thermal insulators. The thermal-conductivity of thermoplastic foams ($\lambda$) is generally comprised of the thermal-conductivity of the solid phase ($\lambda_s$), the gas phase ($\lambda_g$), the convective ($\lambda_c$), and the radiative ($\lambda_r$) components:

$$\lambda = \lambda_s + \lambda_g + \lambda_c + \lambda_r$$

Conduction through the thermoplastic foam material itself (the cell wall material) amounts to about 25% of the total energy transfer, and conduction through the gas within the cells amounts to about 50% of the total energy transfer. The effect of natural convection within the cell walls is a function of the cell dimension. The overall effect of cell gas convection energy transfer on total insulation characteristics is, however, considered to be small for all but very low density foams having very large cell size. The final cell size of the present invention will depend on the original cell size of the primarily blown material. This can be varied in a large range from very small to very large.

In order to reduce the thermal conductivity of the polymeric foam it is necessary to minimize all of the above factors. Reducing the foam density, therefore, helps to lower the thermal conductivity. Additional benefits to using the low density foams of the present invention are economic. Because there is less material cost, the insulations are cheaper to manufacture, yet perform better than insulators made with foams of higher density. Transport costs are decreased because of diminished weight. Construction costs are decreased because the insulation is easier to handle. Insulations made with the present invention would include all types, especially tube or sheet insulations for pipe and ductwork.

The following examples provide detailed information on several foams made according to the present invention.

EXAMPLES

Example 1

A sample of a primarily foamed poly(ethylene terephthalate) material was placed into a vessel at 116° C. and −100 kPa for 5 minutes. The density of the material before being placed into the vessel was approximately 0.16 grams per cubic centimeter. The vacuum was released and the foam sample was placed into a temperature controlled, pressure vessel containing carbon dioxide at 180° C. and 689 kPa for 4 hours. The pressure was then released from the vessel and the carbon dioxide was allowed to escape. The density of the sample after the secondary expansion, measured by water immersion, was approximately 0.0080 grams/cc. The secondarily expanded sample was also much more flexible than it was in its primarily expanded state.

The nearly same experiment was also run without the vacuum step. A similar sample of poly(ethylene terephthalate) material having a density of 0.16 grams per cubic centimeter was placed into a pressure vessel containing carbon dioxide at 180° C. and 689 kPa for 4 hours. The final density of the sample was 0.15 grams/cc.

Example 2

A sample of a primarily foamed, low density poly (ethylene) tube was placed into a vessel at 35° C. and −68 kPa for 3 minutes. The density of the material before being placed into the vessel was approximately 0.024 grams per cubic centimeter. The vacuum was released and the foamed tube was placed into a temperature controlled, pressure vessel containing carbon dioxide at 32° C. and 689 kPa for 14 hours. The pressure was then released from the vessel and the carbon dioxide was allowed to escape. The density of the sample after the secondary expansion, measured by water immersion, was approximately 0.019 grams/cc.

The nearly same experiment was also run without the vacuum step. A similar sample of low density poly(ethylene) tube having a density of 0.024 grams per cubic centimeter was placed into a pressure vessel containing carbon dioxide at 32° C. and 689 kPa for 14 hours. The final density of the sample was 0.024 grams/cc.

Example 3

A sample of a primarily foamed poly(ethylene terephthalate) material was placed into a vessel at 116° C. and −80 kPa for 5 minutes. The density of the material before being placed into the vessel was approximately 0.16 grams per cubic centimeter. The vacuum was released and the foam sample was placed into a temperature controlled, pressure vessel containing air at 180° C. and 838 kPa for 1 hour. The pressure was then released from the vessel and the air was allowed to escape. The density of the sample after the secondary expansion, measured by water immersion, was approximately 0.016 grams/cc. The secondarily expanded sample was also much more flexible than it was in its primarily expanded state.

The nearly same experiment was also run without the vacuum step. A similar sample of poly(ethylene terephthalate) material having a density of 0.16 grams per cubic centimeter was placed into a pressure vessel containing air at 180° C. and 838 kPa for 1 hour. The final density of the sample was 0.21 grams/cc.

Example 4

A sample of a primarily foamed poly(ethylene terephthalate) material was placed into a vessel at 80° C. and −100 kPa for 5 minutes. The density of the material before being placed into the vessel was approximately 0.16 grams per cubic centimeter. The vacuum was released and the foam sample was placed into a temperature controlled, pressure vessel containing carbon dioxide at 180° C. and 138 kPa for 4 hours. The pressure was then released from the vessel and the air was allowed to escape. The density of the sample after the secondary expansion, measured by water immersion, was approximately 0.048 grams/cc. The secondarily expand sample was also much more flexible than it was in its primarily expanded state.

The nearly same experiment was also run without the vacuum step. A similar sample of poly(ethylene terephthalate) material having a density of 0.16 grams per cubic centimeter was placed into a pressure vessel containing carbon dioxide at 180° C. 138 kPa for 4 hours. The final density of the sample was 0.13 grams/cc.

The following table summarizes the results of the above examples and the percent change in density in each case.

TABLE

| Example | Starting δ (g/cc) | Final δ without Vacuum Step (g/cc) (% decrease) | Final δ with Vacuum Step (g/cc) (% decrease) |
|---|---|---|---|
| 1 | 0.16 | 0.15 (6.3%) | 0.0080 (95.0%) |
| 2 | 0.024 | 0.024 (0%) | 0.019 (20.8%) |
| 3 | 0.16 | 0.21 (−31.3%) | 0.016 (90%) |
| 4 | 0.16 | 0.13 (18.8%) | 0.048 (70.0%) |

As seen from the above, in each case where the material was processed in accordance with the present invention, large decreases in density are seen and range from approximately 20% to 95%. In cases where the material was exposed only to secondary blowing, small decreases were seen, ranging from no change to approximately 19%. In one case, an increase in density was seen. These data show the effectiveness of pretreating the material with the vacuum step.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed:

1. A thermoplastic polymer foam having a melting temperature and being either an amorphous thermoplastic polymer foam with a softening temperature or a semicrystalline thermoplastic polymer foam with a glass transition temperature, said thermoplastic foam further having a lower density and increased flexibility after being subjected to a process comprising the steps of:

(a) decreasing the pressure on a primarily foamed thermoplastic polymer foam which had an initial density and which was under an initial pressure to a subatmospheric pressure, and adjusting the temperature of said primarily foamed thermoplastic polymer foam to be in a range of less than said melting temperature of said thermoplastic polymer foam and greater than said softening temperature when said thermoplastic polymer foam is amorphous, or greater than said glass transition temperature when said thermoplastic polymer foam is semicrystalline, whereby said thermoplastic foam expands;

(b) then exposing said thermoplastic polymer foam to a superatmospheric pressure and a secondary expansion gas for a sufficient amount of time to cause said gas to permeate into said thermoplastic polymer foam; and (c) then releasing said superatmospheric pressure acting on said thermoplastic polymer foam whereby said thermoplastic polymer foam expands.

2. The thermoplastic polymer foam of claim 1 wherein during step (c) said thermoplastic foam is in the same range as during step (b).

3. The thermoplastic polymer foam of claim 1 which has a density in the range of from 0.008 to 0.02 grams/cubic centimeter after step (c).

4. The thermoplastic polymer foam of claim 1 which is comprised of poly(ethylene terephthalate).

5. The thermoplastic polymer foam of claim 1 which is comprised of poly(ethylene).

6. The thermoplastic polymer foam of claim 1 which is comprised of a thermoplastic polymer which is one of a polystyrene and a polyolefin.

7. The thermoplastic polymer foam of claim 1 wherein said thermoplastic polymer foam has a density in the range of from about 15% to about 96% lower than the initial density of the primarily foamed thermoplastic polymer foam.

8. A thermoplastic polymer foam having a melting temperature and being either an amorphous thermoplastic polymer foam with a softening temperature or a semicrystalline thermoplastic polymer foam with a glass transition temperature, said thermoplastic polymer foam having a lower density and increased flexibility after being subjected to a process comprising the steps of:

(a) heating a primarily foamed thermoplastic polymer with an initial density to a temperature sufficient to cause said thermoplastic polymer foam to expand;

(b) exposing said thermoplastic polymer foam to a superatmospheric pressure and a secondary blowing gas for a sufficient amount of time to cause said gas to permeate into said thermoplastic polymer foam; and (c) releasing said superatmospheric pressure on said thermoplastic polymer foam whereby said thermoplastic polymer foam expands.

9. The thermoplastic polymer foam of claim 8 wherein during step (c) the temperature of said thermoplastic polymer foam is in a range of less than said melting temperature of said thermoplastic polymer foam and greater than said softening temperature if said thermoplastic polymer foam is amorphous, or greater than said glass transition temperature if said thermoplastic polymer foam is semicrystalline.

10. The thermoplastic polymer foam of claim 9 wherein during step (c) said thermoplastic foam is under said temperature of step (b).

11. The thermoplastic polymer foam of claim 8 which has a density in the range of from 0.008 to 0.02 grams/cubic centimeter after step (c).

12. The thermoplastic polymer foam of claim 8 which is comprised of poly(ethylene terephthalate).

13. The thermoplastic polymer foam of claim 8 which is comprised of poly(ethylene).

14. The thermoplastic polymer foam of claim 8 which is comprised of a thermoplastic polymer which is one of a polystyrene and a polyolefin.

15. The thermoplastic polymer foam of claim 8 wherein said thermoplastic polymer foam has a density in the range of from about 15% to about 96% lower than said initial density of said primarily foamed thermoplastic polymer foam.

* * * * *